United States Patent [19]

Nagai et al.

[11] Patent Number: 5,394,395
[45] Date of Patent: Feb. 28, 1995

[54] CELL DELAY ADDITION CIRCUIT

[75] Inventors: Tetsuya Nagai, Yokohama; Katsuyuki Yamazaki, Tsurugashima, both of Japan

[73] Assignees: Matsushita Electric Industrial Co., Ltd., Osaka; Kokusai Denshin Denwa Co., Ltd., Tokyo, both of Japan

[21] Appl. No.: 84,958

[22] Filed: Jul. 2, 1993

[30] Foreign Application Priority Data

Jul. 10, 1992 [JP] Japan ................... 4-183985

[51] Int. Cl.⁶ ............................................. H04L 12/56
[52] U.S. Cl. ................................... 370/60; 370/94.1
[58] Field of Search ................ 370/17, 108, 60, 60.1, 370/61, 94.1, 94.2; 375/118

[56] References Cited

U.S. PATENT DOCUMENTS

| | | | |
|---|---|---|---|
| 4,255,814 | 3/1981 | Osborn | 455/53.1 |
| 4,271,483 | 6/1981 | Baldwin et al. | 370/108 |
| 4,894,823 | 1/1990 | Adelmann et al. | 370/60 |
| 5,127,000 | 6/1992 | Henrion | 370/60 |
| 5,138,637 | 8/1992 | Fox | 375/118 |

FOREIGN PATENT DOCUMENTS 2114714  4/1990  Japan .

*Primary Examiner*—Douglas W. Olms
*Assistant Examiner*—Chau T. Nguyen
*Attorney, Agent, or Firm*—Stevens, Davis, Miller & Mosher

[57] ABSTRACT

A cell delay addition circuit can easily feed any desired delay to each of input cells in a communication apparatus or the like for asynchronous transfer mode operation. A time stamp is obtained for an inputted cell based on a sum of a delay amount from a delay amount producing circuit and the current time produced by a clock circuit. The time stamp and the input cell are written in a cell buffer. On the reading side, a comparator reads out a time stamp from the cell buffer and when the comparator detects that the current time tm is equal to or greater than the time stamp, the comparator produces a cell output enable signal ce so that the cell buffer produces the cell.

8 Claims, 2 Drawing Sheets

CELL DELAY ADDITION CIRCUIT

BACKGROUND OF THE INVENTION

The present invention relates to a cell delay addition circuit for use in a communication apparatus or the like for an asynchronous transfer mode (hereinafter abbreviated as ATM).

At the present time, ATM is to be adopted as a communication system of the broad band ISDN (Integrated Services Digital Network). In the ATM network, delay and fluctuation thereof occur in propagation of cells. A communication apparatus for ATM must be designed in consideration of the delay and fluctuation thereof and an operation test thereof is required to be made in consideration of the delay and fluctuation. Accordingly, an estimation apparatus of the communication apparatus for ATM is required to give the delay and fluctuation to a cell as one of simulation functions of the ATM network.

However, since ATM itself is a novel technique, a circuit having such a function is not used heretofore.

SUMMARY OF THE INVENTION

It is an object of the present invention to provide an excellent cell delay addition circuit capable of giving any delay to each of input cells easily.

In order to achieve the object, the cell delay addition circuit of the present invention comprises delay amount producing means for producing a delay amount to be added to a cell each time the cell is received, a clock for generating a current time, summing means for calculating a sum of an output value of the delay amount producing means and an output value of the clock to produce the sum as a time stamp, a cell buffer responsive to each reception of a cell, for storing the cell and the time stamp from the summing means, which corresponds to the cell and for outputting a time stamp corresponding to a cell to be outputted next, and comparison means for comparing the output value of the clock with an output value of the cell buffer to instruct the cell buffer to produce the cell when the current time received from the clock is equal to or greater than the time stamp value received from the cell buffer.

According to the present invention, with the above configuration, the delay amount produced by the delay amount producing means can be added to each cell. More particularly, the time stamp written on a writing side of the cell buffer together with contents of the cell is a sum of "the delay amount to be added" and an arrival time of the cell. Accordingly, the cell is produced at the time indicated by the time stamp on a reading side, so that a predetermined delay is added to the cell.

DESCRIPTION OF THE PREFERRED EMBODIMENTS

Figure 1:
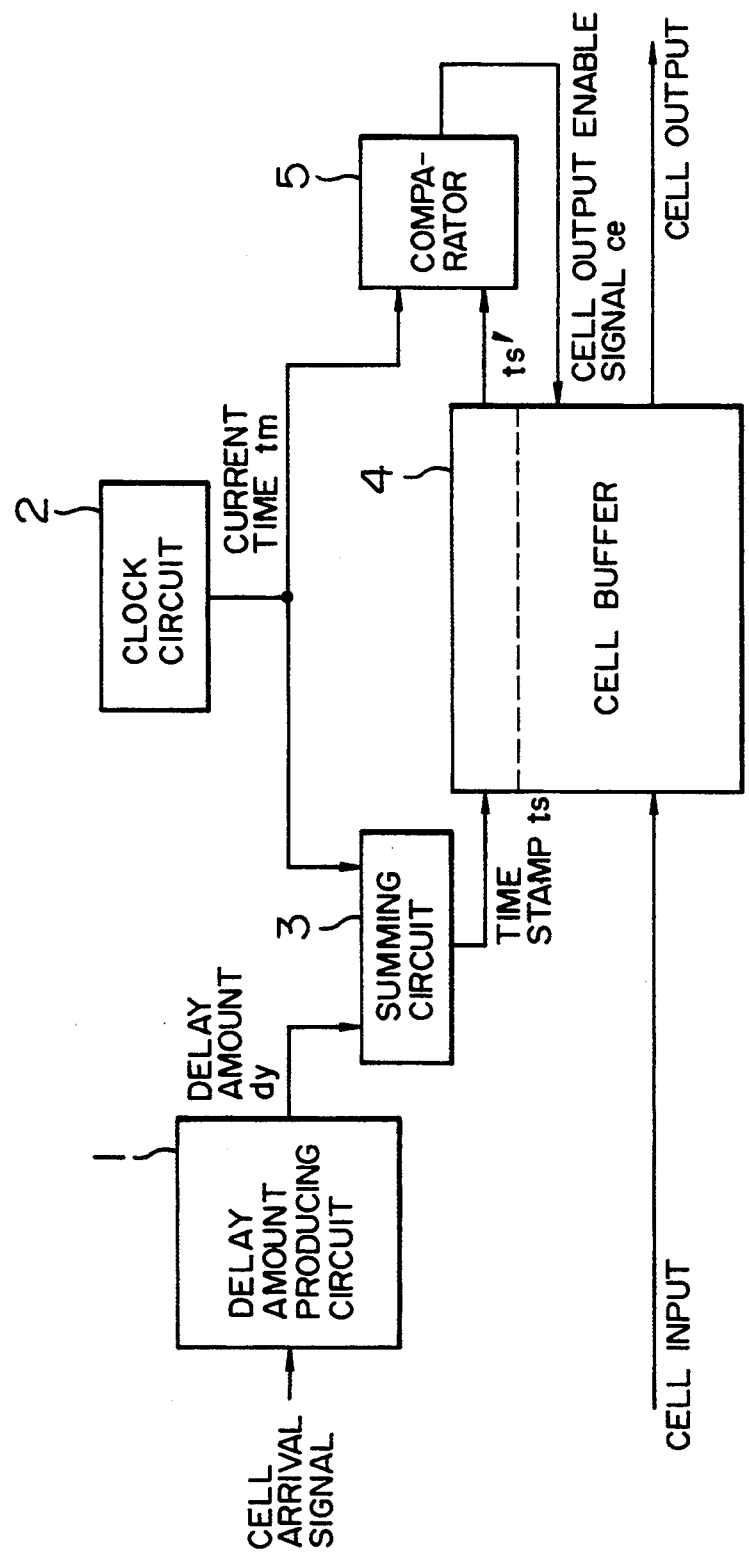
FIG. 1 is a block diagram schematically illustrating a cell delay addition circuit according to an embodiment of the present invention.

FIG. 1 schematically illustrates a cell delay addition circuit according to an embodiment of the present invention. In FIG. 1, numeral 1 denotes a delay amount producing circuit including a read only memory as a main constituent element. The read only memory stores delay amounts dy to be given to cells and the delay amount is read out from the read only memory one by one to be produced each time a cell arrival signal is inputted. The cell arrival signal is activated each time a cell reaches the cell delay addition circuit. Numeral 2 denotes a clock circuit which always continuously produces the current time tm of this system. Numeral 3 denotes a summing circuit which calculates a sum of the delay amount dy and the current time tm and produces a time stamp ts. Numeral 4 denotes a cell buffer which operates in the first-in first-out manner and takes in data having the time stamp ts in addition to a cell upon arrival of the cell. Numeral 5 denotes a comparator which reads out a time stamp ts' from the cell buffer and compares it with the current time tm. Thus, when the following condition is satisfied $$tm \geq ts'$$

the comparator produces a cell output enable signal ce to supply it to the cell buffer 4.

Figure 2:
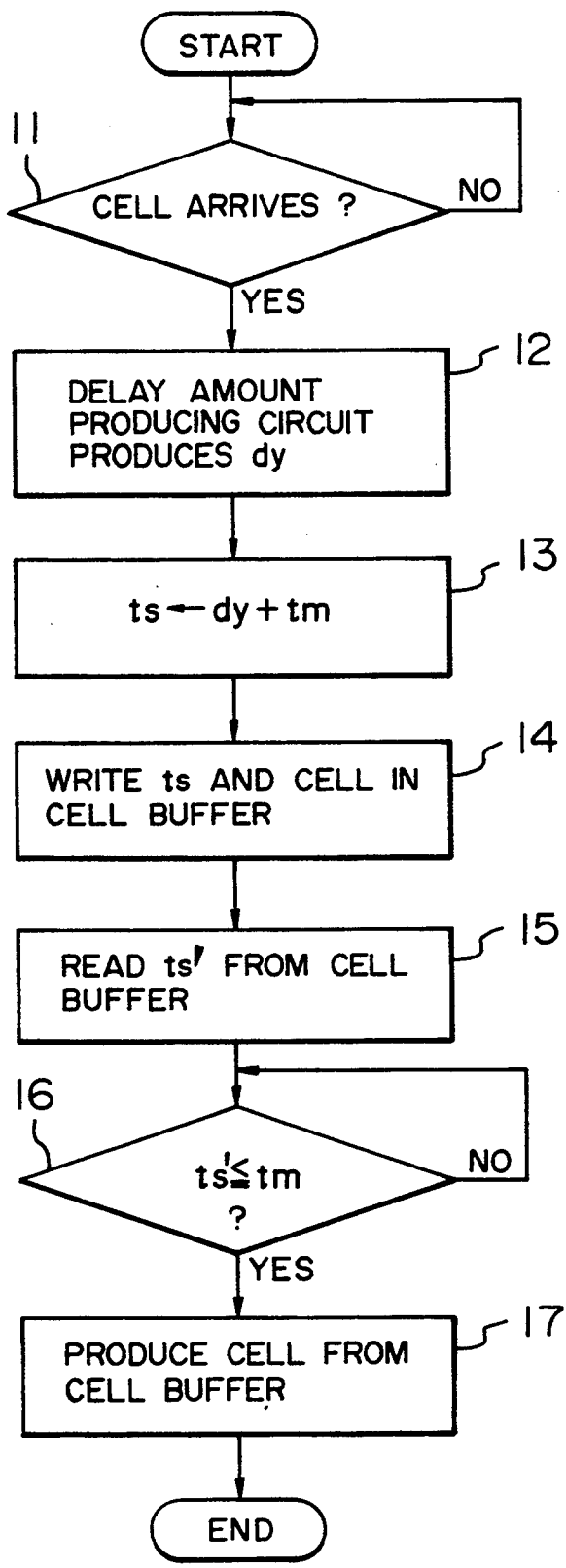
FIG. 2 is a flow chart illustrating the operation of the embodiment of the present invention.

Operation of the embodiment is now described with reference to a flow chart of FIG. 2. In FIG. 2, when the cell arrival signal is active (step 11), the delay amount producing circuit 1 produces the delay amount dy (step 12). The current time tm is added to the delay amount dy in the summing circuit 3 so that the time stamp ts is obtained (step 13). The time stamp ts is written in the cell buffer 4, together with contents of the cell which has just arrived (step 14). The time stamp ts at this time represents a time that the corresponding cell is to be read out from the cell buffer 4 and be produced. On the other hand, the comparator 5 reads out a time stamp ts' from the cell buffer 4 (step 15) and compares it with the current time tm (step 16). Thus, when the following condition is satisfied $$tm \geq ts'$$

that is, when the current time reaches a time that the cell corresponding to the time stamp ts' is to be produced, the comparator produces the cell output enable signal ce to supply it to the cell buffer 4. The cell buffer 4 produces the cell in response to the cell output enable signal ce (step 17). When the cell has been produced, the comparator 5 reads out a time stamp ts' from the cell buffer again, and the same operation is repeated.

As described above, according to the embodiment, when the delay amount dy to be given to the cell is produced from the delay amount producing circuit 1, the summing circuit 2 adds the delay amount dy to the current time tm produced from the clock circuit 2 to produce the time stamp ts which is stored in the cell buffer 4. The comparator 5 reads out a time stamp ts' from the cell buffer 4 to compare it with the current time tm and when $tm \geq ts'$ the cell is produced from the cell buffer 4. Accordingly, the delay amount dy can be added to each of the input cells.

In the embodiment, the delay amount produced by the delay amount producing circuit 1 may be a fixed value or a value varied each time the cell is received. It may be realized by loading a delay amount dy into a random access memory externally or by producing the delay amount dy from a random number producing circuit or a sequencer each time the cell arrival signal is active.

We claim:

1. A cell delay addition circuit for receiving a series of cells and sequentially outputting the cells in a delayed fashion, said circuit comprising:

delay amount producing means, responsive to reception of said cells, for producing delay amount data representing delay amounts to be added to individual ones of said cells, said delay amounts being varied for different ones of said individual cells;

means for generating current time data representing a current time;

summing means for calculating individual sums of said delay amount data and said current time data for said individual ones of said cells and outputting the individual sums as individual time stamp data for said individual ones of said cells;

a cell buffer responsive to reception of said cells, for (i) storing the individual ones of said cells and said individual time stamp data corresponding to said individual ones of said cells, (ii) outputting an individual one of said stored cells when said cell buffer receives an enable signal, and (iii) outputting stored individual time stamp data corresponding to a stored cell to be output after said individual one of said stored cells; and comparison means for (i) comparing said current time data with any stored individual time stamp data output from said cell buffer, and (ii) outputting said enable signal to said cell buffer when a value represented by said current time data is equal to or greater than a value represented by said any stored individual time stamp data output from said cell buffer.

2. A cell delay addition circuit according to claim 1, wherein said delay amount producing means includes a random access memory to which the delay amount is added externally.

3. A cell delay addition circuit according to claim 2, wherein said stored individual time stamp data output by said cell buffer corresponds to a stored cell to be output next after said individual one of said stored cells.

4. A cell delay addition circuit according to claim 1, wherein said delay amount producing means includes a random number producing circuit.

5. A cell delay addition circuit according to claim 4, wherein said stored individual time stamp data output by said cell buffer corresponds to a stored cell to be output next after said individual one of said stored cells.

6. A cell delay addition circuit according to claim 1, wherein said delay amount producing means includes a sequencer.

7. A cell delay addition circuit according to claim 6, wherein said stored individual time stamp data output by said cell buffer corresponds to a stored cell to be output next after said individual one of said stored cells.

8. A cell delay addition circuit according to claim 1, wherein said stored individual time stamp data output by said cell buffer corresponds to a stored cell to be output next after said individual one of said stored cells.

* * * * *